June 17, 1930.  T. W. B. WATLING  1,763,839
AMUSEMENT APPARATUS
Filed Dec. 26, 1922  2 Sheets-Sheet 1
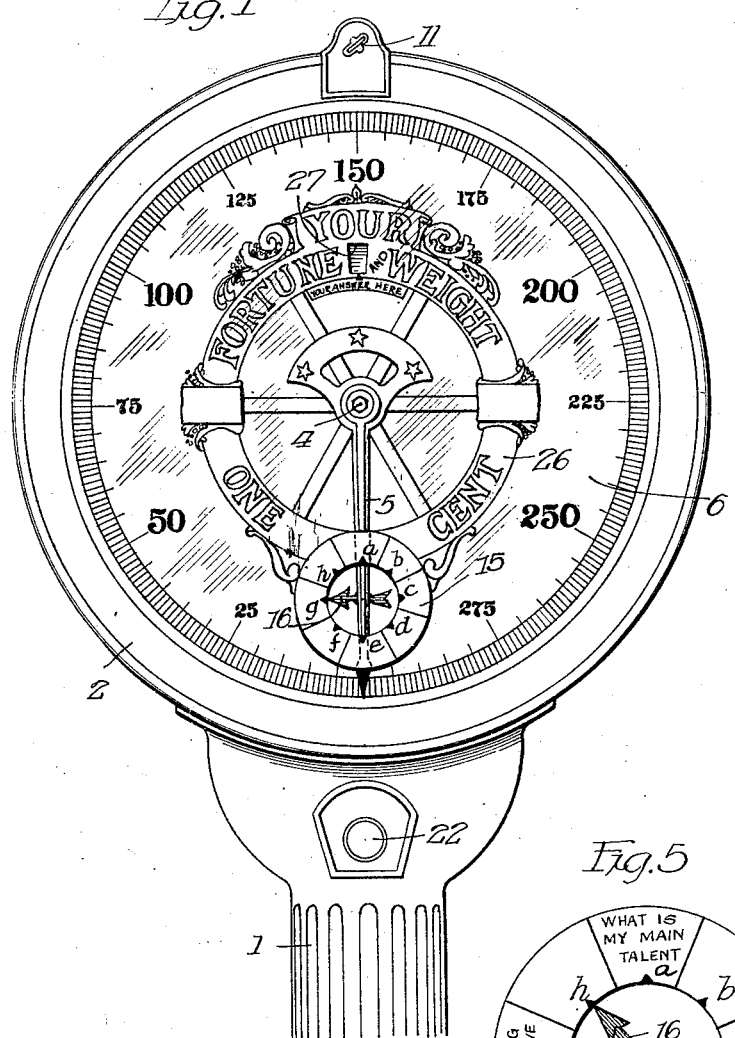
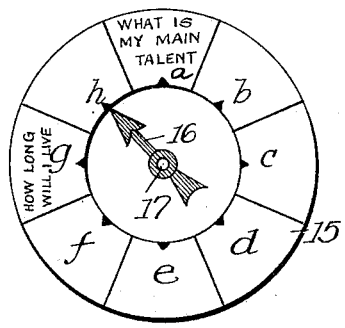
Inventor
Thomas W. B. Watling,
By Fisher, Parle, Clapp & Ioans
Attys.

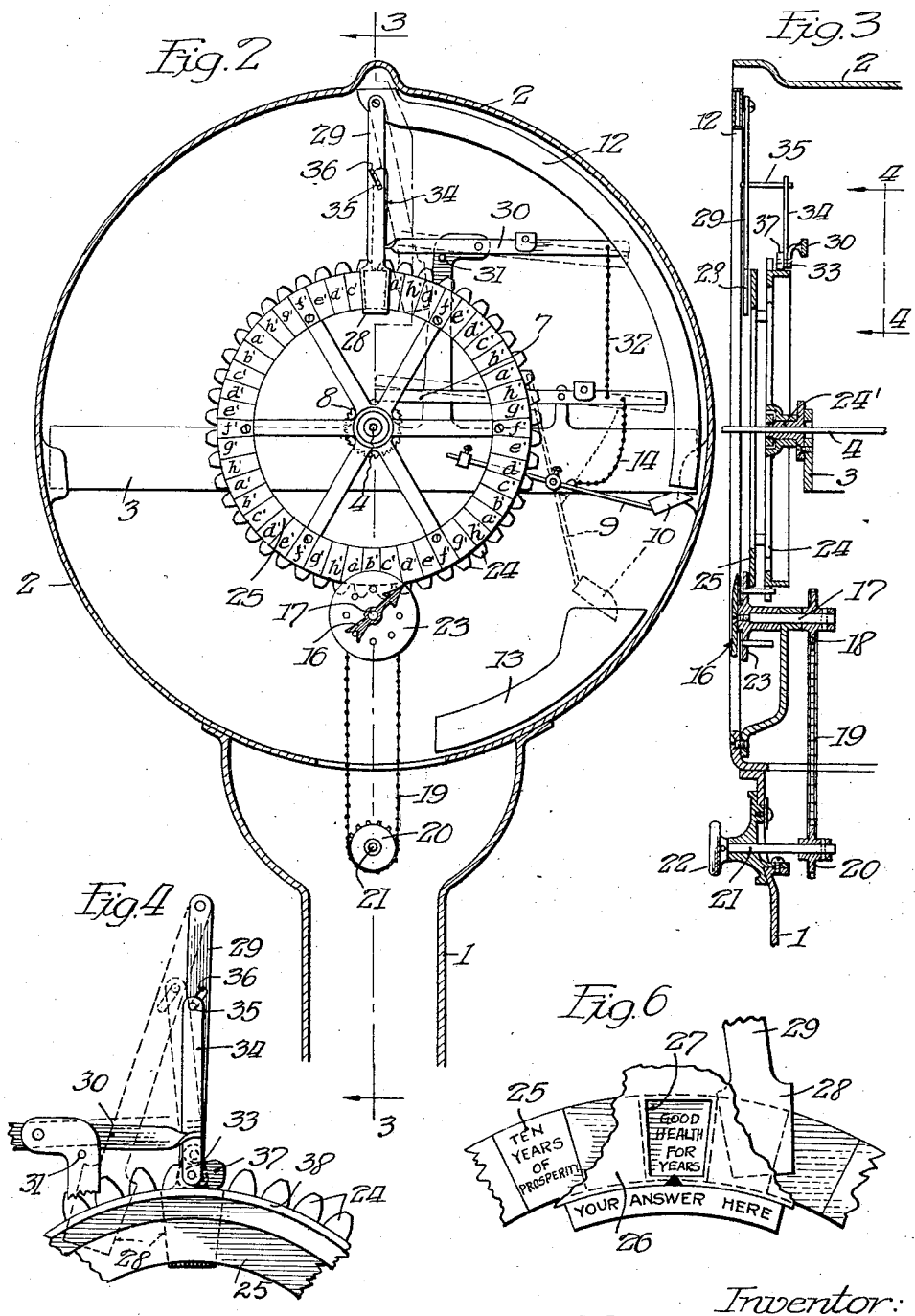

Patented June 17, 1930

1,763,839

UNITED STATES PATENT OFFICE

THOMAS W. B. WATLING, OF CHICAGO, ILLINOIS

AMUSEMENT APPARATUS

Application filed December 26, 1922. Serial No. 608,865.

The invention relates to amusement or fortune telling apparatus and seeks to provide in connection with a pointer for indicating any one of a number of questions, suitable means, which is preferably coin-controlled, for indicating one of a number of different answers to each of the questions. The invention consists in the features of improvement hereinafter set forth, illustrated in the preferred form in the accompanying drawings and more particularly pointed out in the appended claims.

As noted the apparatus is preferably coin-controlled and it may be associated and operated in connection with other coin-controlled apparatus.

In the drawings:

Fig. 1 is a view in elevation of the upper portion of a coin-controlled weighing scale with the present improvement applied thereto;

Fig. 2 is a similar view with the front of the casing of the scale removed and the casing shown in section;

Fig. 3 is a vertical section on the line 3—3 of parts shown in Fig. 2;

Fig. 4 is a detail view looking in the direction of the arrows 4 in Fig. 3;

Figs. 5 and 6 are detail views on an enlarged scale of the question and answer indicating devices.

The casing of the machine illustrated comprises a stand 1 mounted upon a suitable base (not shown) and supporting an enlarged head 2. A transverse frame 3 mounted within the head carries a shaft 4 for a pointer 5, and the latter cooperates with a suitable dial 6 to indicate the weight placed upon the scale platform. In the construction shown, the dial is made of glass and the pointer is movable behind it. A counterweighted catch arm 7 is arranged to engage a ratchet wheel 8 on the shaft 4 and lock the pointer against movement. This catch arm is tripped to release the pointer by a counterweighted trip lever 9 having a coin holder or support 10 at one end that is adapted to receive coins deposited in the slot 11 and passing through a curved chute 12 within the head. The weight of a coin deposited in the support 10 is sufficient to overcome the counterweight on the lever 9 and shift it from the position shown in full lines in Fig. 2 to that shown in dotted lines. The coin then passes from the holder into a receiving chute 13 and the lever 9 is returned to its normal position. The latter is connected by a chain 14 with the catch 7 and its movement serves to release the catch and permit the movement of the weight-indicating pointer 5. The weighing mechanism for controlling the movement of the pointer may be of any usual or suitable form, such, for example, as set forth in the prior application of Thomas W. B. Watling and Jerry Macourek, filed July 18, 1918, Serial No. 245,452.

In addition to the weight-indicating numerals and subdivisions, the dial 6 has a small annular, opaque portion forming a small supplementary dial 15, the face of which is divided into sections $a$, $b$, $c$, etc., and each section of which bears a question. A pointer 16 mounted on a shaft 17 carried by the casing is adapted to be rotated to indicate any one of these questions. In the form shown, the pointer is arranged within the casing and behind the transparent glass dial and the inner end of the shaft is provided with a sprocket wheel 18 connected by a chain 19 to a sprocket wheel 20 fixed on the inner end of a shaft 21. The latter extends through the casing and is provided on its outer end with a knob 22 which can be manipulated by the user of the apparatus to indicate any one of the questions on the small dial 15.

The shaft 17 which carries the pointer 16 is also provided with a pin-toothed gear wheel 23 meshing with the teeth of a gear 24 which, in the form shown, is concentric with the weight-indicating pointer and is journalled on a bearing 24' through which the pointer shaft 4 extends. This gear wheel carries an annular dial 25 which bears in different subdivisions thereof a number of series of answers $a'$, $b'$, $c'$, etc., which correspond respectively with the questions $a$, $b$, $c$, etc. That is to say, in each series of answers upon the large annual dial 25, there is an answer to each of the series of questions on the small dial 15, and the gearing between the pointer 16 and the dial 25 is so arranged that when the pointer is brought into register with one of the questions, one of the answers to that question will register with a suitable view opening. In the form shown, the glass dial 6 is provided with an annular, opaque portion 26 which covers the greater portion of the face of the annular dial 25, but is provided with a view opening 27 through which one of the sub-divisions of the dial may be exposed.

A shutter 28 arranged within the casing is adapted to obstruct the view opening 27, but is shiftable to expose one of the sub-divisions of the dial 25. This shutter is formed upon the lower end of an arm 29 which is pivotally connected at its upper end to the framework of the casing and is adapted to be shifted by a counterweighted arm 30 which is pivotally mounted intermediate its ends and normally rests upon a stop pin 31. The outer end of the shifter arm 30 is connected by a chain 32 to the catch 7 and is adapted to be shifted with the latter when a coin is deposited in the slot 11. The inner end of the arm 30 is laterally off-set and bent downwardly to form a lug 33 and is then bent upon itself to form an upwardly projecting extension 34. The latter has a pin 35 fixed thereto which projects forwardly and engages an inclined cam slot 36 formed in the shutter arm 29. A dog 37 pivotally mounted on the extension 34 of the trip arm 30 is arranged to cooperate with a rearwardly projecting flange 38 formed upon the gear wheel 24.

When the shutter obstructs the view opening 27 the parts assume the position shown in full lines in Figs. 2 and 4, and the dog 37 projects laterally from its pivot and rests upon the face of the flange 38 of the gear wheel 24. The user by means of the knob 22 and connecting gearing can rotate the indicating pointer into register with any one of the questions on the dial 15. This also serves to rotate the gear wheel 24 and the annular dial 25 and bring one of the answers to the corresponding question in register with the view opening 28. Then, when a coin is deposited, the catch 7 is shifted as described to release the weight indicating pointer and at the same time the outer end of the shifter arm 30 is depressed and its inner end raised. The raising of the inner end of the arm 30 shifts the pin 35 through the cam slot 36 and moves the shutter from the position shown in full lines in Fig. 2 to that shown in dotted lines and thereby exposes the answer opposite the view opening. This shift of the arm 30 also permits the dog 37 to swing down into a position vertically below its pivot and its engagement with the flange 38 then holds the shutter in shifted position. The shutter is thus maintained in shifted position until the pointer 16 and gear wheel 24 are again moved. Rotation of the gear wheel and its flange 38 in either direction will shift the dog 37 to one side or the other and the shifter arm and shutter will be returned by gravity to the positions shown in full lines in Figs. 2 and 4.

Obviously, changes may be made in the details set forth without departure from the essentials of the invention as defined in the claims.

I claim as my invention:

1. In an apparatus of the class described, the combination with a casing, of a pointer operable from the exterior of the casing for indicating one of a number of questions, a dial in the casing geared to said pointer and bearing on different subdivisions thereof a plurality of answers to each of the questions, a shutter shiftable to expose one of the sections of the dial, means for shifting said shutter, and means adapted to be released by the movement of said pointer for holding said shutter in shifted position, substantially as described.

2. In an apparatus of the class described, a casing having a view opening, a rotatable pointer operable from the exterior of the casing for indicating one of a series of questions, a rotatable dial in said casing positively geared to said pointer and bearing a plurality of series of corresponding answers adapted to register one at a time with said view opening, a shutter for said opening, means for shifting said shutter, and means controlled by the movement of said pointer for restoring said shutter, substantially as described.

3. In an apparatus of the class described, the combination with a casing, of a weight indicator, a question indicator operable from the exterior of the casing, a dial in the casing positively geared to said question indicator and bearing on different sub-divisions thereof a plurality of answers to each of the questions, a shutter shiftable to expose one of the answers on the dial, a shifter for said shutter, a latch for said weight indicator and common means for actuating said shifter and said latch arranged to permit the independent return to normal position of said latch and said shutter.

4. In an apparatus of the class described, the combination with a casing, of a weight indicator, a question indicator operable from the exterior of the casing, a dial in said casing positively geared to said question indicator and bearing on different sub-divisions thereof a plurality of answers to each of the questions, a shutter shiftable to expose one of the answers on the dial, a coin-controlled trip for releasing said weight indicator, a shifter for said shutter actuated by said trip and means released by the succeeding operation of said question indicator for holding the shutter in shifted position.

5. In an apparatus of the class described, the combination of a casing, means operable from the exterior of the casing for indicating any one of a number of different questions, a dial in the casing geared to said question indicating means and carrying a plurality of answers to each of the questions, a shutter shiftable to expose one of the answers on the dial, a shifter for operating said shutter and a dog for holding said shutter in shifted position adapted to be released by the movement of said question indicating means.

6. In an apparatus of the class described, the combination of a casing, a question indicator operable from the exterior of the casing, a member positively geared to said question indicator and movable therewith, said member bearing on different sub-divisions thereof a plurality of answers to each of the questions, a part operative independently of said question indicator and arranged to cooperate with said member to indicate one of the answers thereon, means for operating said part, and means controlled by the movement of said question indicator for restoring said part to normal condition.

7. In an apparatus of the class described, the combination of a casing, a question indicator operable from the exterior of the casing, a member positively geared to said question indicator and bearing on different sub-divisions thereof a plurality of answers to each of the questions, a part shiftable to indicate one of the answers on said member, means for shifting said part and means controlled by the movement of the question indicator for restoring said part, substantially as described.

THOMAS W. B. WATLING.